United States Patent
Ricklis (10) Patent No.: US 11,681,772 B2
(45) Date of Patent: Jun. 20, 2023

(54) SYSTEMS, METHODS, AND MEDIA ENABLING STREAMLINED USER EXPERIENCES ACROSS PROGRESSIVE WEB APPLICATIONS

(71) Applicant: Capital One Services, LLC, McLean, VA (US)

(72) Inventor: Jonathan Ricklis, Richardson, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/401,960

(22) Filed: Aug. 13, 2021

(65) Prior Publication Data
US 2023/0052991 A1   Feb. 16, 2023

(51) Int. Cl.
*G06F 16/958* (2019.01)
*G06F 9/445* (2018.01)

(52) U.S. Cl.
CPC ........ *G06F 16/958* (2019.01); *G06F 9/44505* (2013.01)

(58) Field of Classification Search
CPC ............................ G06F 16/958; G06F 9/44505
USPC ........................................................ 715/234
See application file for complete search history.

(56) References Cited

U.S. PATENT DOCUMENTS

2020/0244752 A1   7/2020   Trainor

FOREIGN PATENT DOCUMENTS

| CN | 107609150 A | 1/2018 |
| CN | 108376127 A | 8/2018 |
| CN | 109739478 A | 5/2019 |

OTHER PUBLICATIONS

Alligator, Introduction to Progressive Web Apps (PWAs) service Worker & Manifest, published Nov. 9, 2016 Via DigitalOcean, pp. 1-7 (pdf).*
Demian Renzulli et al., Building multiple Progressive Web Apps on the same domain, Published Jun. 2, 2021 via web.dev, pp. 1-12 (pdf).*

* cited by examiner

*Primary Examiner* — Manglesh M Patel
(74) *Attorney, Agent, or Firm* — Sterne, Kessler, Goldstein & Fox P.L.L.C.

(57) ABSTRACT

Methods, systems, and media enabling a progressive web application (PWA) across a web domain are provided. The PWA may be enabled by web applications among a plurality of web applications executing respective portions of the PWA functionality via linking a root level web page to a manifest. The manifest may contain metadata describing a PWA architecture across the web domain. Enabling the PWA may further include executing, by a root service worker, one or more scripts configured to enable registration by one or more component service workers according the manifest To enable the PWA, applications among a plurality of web applications, and registering, by the one or more component service workers, the web applications among the plurality of web applications.

20 Claims, 5 Drawing Sheets

SYSTEMS, METHODS, AND MEDIA ENABLING STREAMLINED USER EXPERIENCES ACROSS PROGRESSIVE WEB APPLICATIONS

BACKGROUND

The establishment of ubiquitous mobile platforms (e.g., smartphones and tablets) has supplanted the desktop computing experience as foremost in the e-commerce realm. As a result, it is no longer preferable to develop a fixed piece of software (i.e., an application) for installation on a desktop computer personal computer (PC). As use has migrated to these more portable form-factors, greater emphasis has been placed on accessibility across multiple devices or operating systems and the overall user experience (UX) on any number of devices users may employ.

The proliferation of native mobile applications (or simply "native apps") has been instrumental in enabling the growth of the modern-day, mobile userbase. A user can install a native app on a mobile device a single time and tap into that functionality anywhere or anytime the mobile device is able to connect to the internet (e.g., via a Wi-Fi or cellular network). However, depending on the tasks being performed, native apps may fail when there is no network connectivity.

Not only can the absence of a network connection render native apps inoperable, but native apps can also be specific to individual platforms. When this is the case, a software developer is forced to create multiple versions of the same native application in order to grant the broadest accessibility possible, potentially leading to separate ANDROID™, IOS™, and WINDOWS™ versions of the same app.

By contrast, a progressive web application (PWA) is a type of software application delivered through protocols compliant with the World Wide Web Consortium (W3C). Frequently, W3C compatible programs/applications are referred to as web applications, or web apps. PWAs, and web apps in general, are commonly built using various coding platforms, such as HTML, CSS, and JAVASCRIPT™. Likewise, PWAs are designed to function on any platform using a web browser that complies with popular standards-based implementations, such as MOZILLA FIREFOX™, GOOGLE CHROME™, APPLE SAFARI™, and MICROSOFT EDGE™. Despite their use across platforms, web apps involve tradeoffs resulting in slower execution, fewer features, a less-cohesive browsing/user experience than native apps, and no ability to use the application offline. PWAs solve some of the downsides of traditional web apps by giving access to more native features, the ability to download the PWA to the user's device, offline mode, and an overall faster user experience enabled by advanced caching. However, as traditionally implemented, PWAs are not suitable for complex web applications made up of many smaller micro-applications.

Accordingly, systems, methods and media enabling the use of PWA approaches for web applications with complex architectures are needed.

BRIEF DESCRIPTION OF THE DRAWINGS

Descriptions are given with reference to the figures included herein. When possible and for clarity, reference numbers are kept consistent from figure to figure. Some of the figures are simplified diagrams, which are not to be interpreted as drawn to scale or spatially limiting for the described embodiments. Where appropriate, the particular perspective or orientation of a figure will be given to increase understanding of the depicted features.

DETAILED DESCRIPTION

Descriptions of the below enable a software developer to use PWA approaches even for complex applications composed of multiple micro-apps, each of which is in its own single page application (SPA). The disclosed solutions overcome the architectural challenges presented when building PWA solutions for complex web apps, thus enabling those complex applications access to the benefits of PWA technology (including enabling some native-like capabilities, offline-mode, and mitigating the slower execution some web apps may experience due to bandwidth constraints).

Web apps and PWAs of the instant patent application also avoid the less-cohesive browsing experience or user experience experienced in prior systems. In many web platforms, individual components are designed, implemented, owned and/or maintained by different teams. When approached in this manner, the components act as individual micro-applications (or "microapps") on the same platform, and each of them is a separate single page application (SPA). In the typical implementation of PWA functionality each SPA contains its own manifest and service worker, which turns a traditional SPA into a PWA with all the functional and nonfunctional benefits that entails. But in a complex architecture where a web application is composed of multiple SPAs, the traditional approach would result in each micro app behaving as its own PWA.

As a result, the user experience across microapps within a platform may not be cohesive, and user operations, functionalities, and environments across the microapps may be inconsistent. High-level common functionality, for instance headers, are enabled by a library called an app shell, which allows the platform to share code in order to coordinate between microapps. Other than this loose commonality, however, the microapps operate independently and are developed independently.

These functional challenges may extend to individual user interfaces (UIs), which communicate to backend support that is specific to respective UIs for those microapps. As an example, a complex web application where each micro-app uses the traditional PWA approach may have a landing page having one microapp, UI, and associated backend. Moving to other functionality, such as a dashboard, within the overall web application separate functionality will have a separate backend implementation that is specific to the feature (e.g., the dashboard). Such applications may have a handful, a dozen, or more of these loosely associated individual microapps, depending on the web application. The technical challenge becomes tying these individual pieces together.

In order to allow seamless coordination between such microapps, embodiments of the present application provide multi-SPA architecture with PWA functionality. In standard PWAs, the individual applications or microapps are developed, a manifest is added, and a service worker is added. Subsequently, the whole app is downloaded. Discussed below and shown in the accompanying figures are PWAs that include a plurality of web applications associated with, and that provide functionality for, a portion of a web domain. The described PWAs are defined by a manifest and registered at the root level of the web domain by a service worker. In various ways described in further detail below, some embodiments of the present disclosure use partial service workers for each web application.

Systems, methods, and media enabling these PWAs offer users a unified browsing/navigation experience across multiple micro-applications that is faster after initial loading than a native app. Furthermore, the described PWAs even function in the absence of network connectivity, are accessible across multiple platforms, and are usable by various device form-factors.

While shown in the singular and with simplified terms in the figures and below, one of skill in the relevant art will recognize that implementation of the described embodiments can take many forms. Thus, a single device depicted in the figures or described below may represent several, dozens or hundreds of the devices disclosed. The particular arrangement is likewise not a limiting factor with respect to the scope of the present application. Steps may be performed in a different order, while communications may be carried out directly or indirectly with various devices performing intermediary functions between those described devices.

Figure 1:
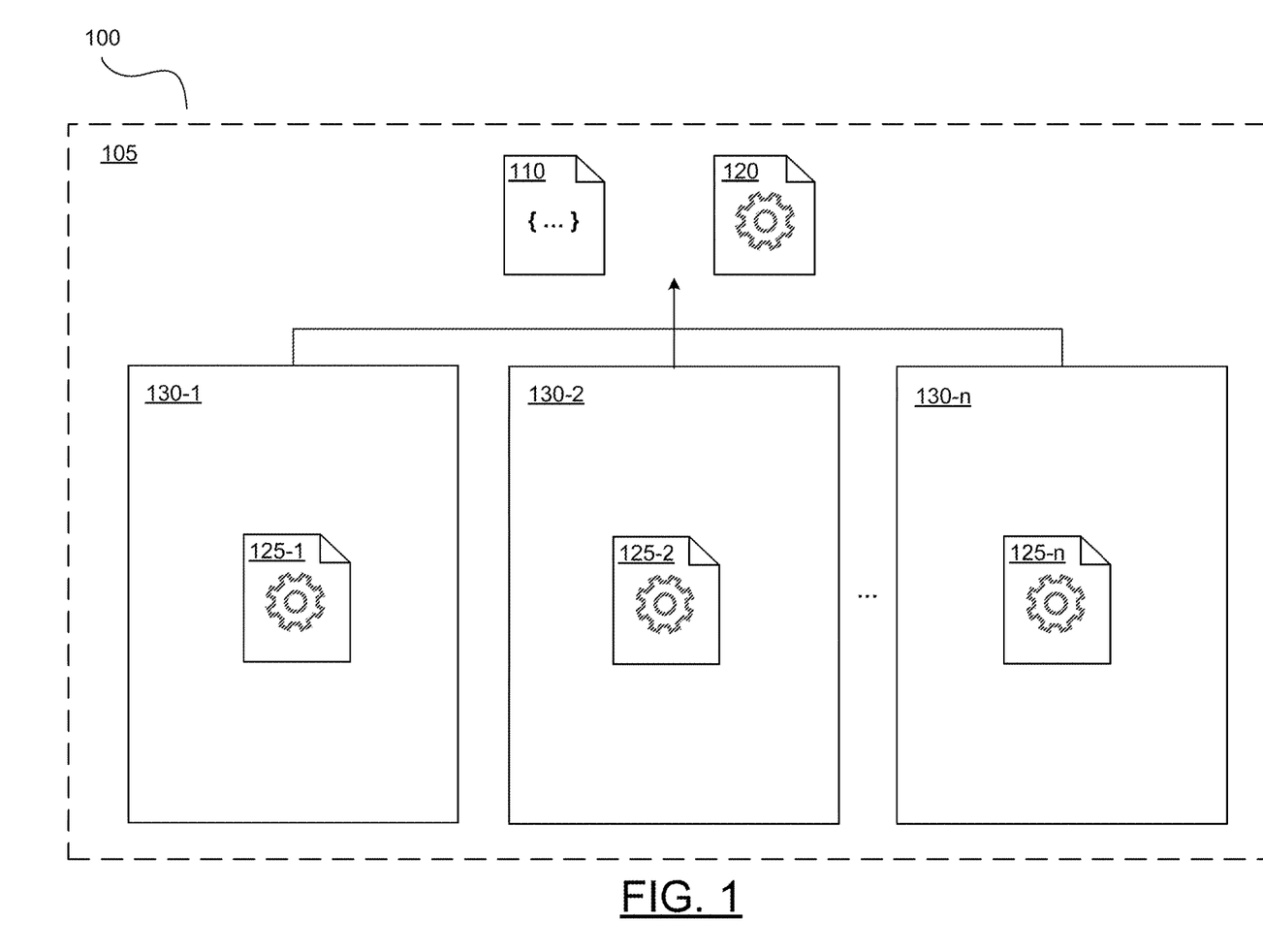
FIG. 1 is a block diagram of a system enabling a progressive web application (PWA), according to embodiments of the present disclosure.

FIG. 1 is a block diagram of a system 100 enabling a progressive web application (PWA) 105 for a web domain. A web domain may be identified by a domain name, or an identification string defining a realm of administrative autonomy, authority, or control within the Internet (described in further detail below). According to various embodiments, system 100 further includes a manifest 110, a service worker script 120, and a plurality of web applications 130-1, 130-2, . . . , 130-n (collectively, "web applications 130"). As illustrated, each of web applications 130 includes a corresponding service worker, e.g., service worker scripts 135-1, 135-2, . . . , 135-n (collectively, "service worker scripts 135"). System 100 can include one or more memories 140 configured to store instructions for the PWA 105, as well as one or more processors 150 configured to execute the PWA 105.

Domain names may be used in various networking contexts, and for application-specific naming and/or addressing purposes. Likewise, domain names may also represent an Internet Protocol (IP) resource such as a personal computer used to access the internet, a server computer hosting a website, the website itself, or any other service communicated via the internet. Domain names follow the rules and procedures of the Domain Name System (DNS). Domain names are organized into subordinate levels (i.e., sub-domains) of the DNS root domain (which is nameless).

For example, www.fictionalhostname.com is a URL for a fictitious web resource. In this example, the domain name is 'fictionalhostname.com'. A user visiting the website www-.fictionalhostname.com would most likely be directed to a landing page, or homepage, having a URL of www.fictionalhostname.com/home ('/home' being the scope of the web domain). The web app(s) accessible by a web browser running a PWA (e.g., the PWA 105) are limited by that scope, and the various web apps included under the umbrella of the greater PWA are accessible by modifying the scope of the web domain.

Websites are sometimes limited to functionality as one-way information feeds, merely presenting information to viewers or users of the website. Many websites are static, meaning content displayed thereon does not update automatically and/or dynamically, and most are built using HTML, CSS, or JAVASCRIPT™. By contrast, a web application (or web app) possesses functionality and interactive elements enabling dynamic engagement between user and web app. Contents of the web app are updated automatically (i.e., in real-time). Like websites, web apps tend to be built using HTML, CSS, or JAVASCRIPT™. GMAIL™, FACEBOOK™ TWITTER™, and YOUTUBE™ are prominent examples of websites with corresponding web apps.

Although both websites and web apps are accessed via a web browser, a web application is software accessed through the browser possessing functionality that is substantially similar or identical to that of a native app (rather than merely a display of information). The functionality of some modern web apps may even exceed that of an analogous native app. To provide such robust functionality and a customizable browsing experience to users, web apps are in constant communication with a number of databases, servers, computing clusters, service workers, and the like.

A manifest provides information about a web application in a JSON text file that is necessary for the web app to be downloaded and presented to a user in a manner similar to a native app. For example, a web app can be installed on a home screen of a computing device and provide users with a faster, richer experience. Manifests typically include the name, version, author, icon(s), description, and resources necessary to run the corresponding PWA.

A service worker is a script, executed by a web browser, running in the background. The service worker executes separately from the web page. Further, a service worker is a type of web worker, a web worker being an object that runs a named JAVASCRIPT™ file containing code that will execute/run in a thread of the worker. Data (e.g., metadata) may be sent between web workers and the main thread via a system of messages in which the data transmitted is ultimately copied rather than shared. Web workers may spawn new web workers so long as the spawned web workers are hosted within the same origin (i.e., domain) as the parent web page/web app.

Considered conceptually, a service worker acts as a proxy server as it sits between a web app, the web browser running the web app, and the network (when available). Service workers enable the creation of offline experiences (e.g., running the web app while the device running the web browser running the web app is not connected to a network). Service workers also intercept network requests and, based upon network availability, may upgrade assets residing on the server hosting the web apps included in a PWA. Service workers may also allow access to push notifications and background synchronization application programming interfaces (APIs) to keep the web app refreshed/updated in real-time.

In embodiments, each of web applications 130 shown in FIG. 1 is respectively associated with and provides functionality for a portion of the web domain. Further, manifest 110 may be configured to define the PWA architecture for web applications 130 across the web domain. Moreover, manifest 110 may define the PWA architecture at the root level of the web domain. Service worker script 120 may be configured to register the PWA at the root level of the web domain.

As an example, a fictitious domain "grocerydelivery.com" may be used to receive groceries from a particular supermarket chain or local grocer. When implementing a PWA for grocerydelivery.com as described above, a manifest can be configured to define the PWA architecture for web applications across the domain. Thus, a landing, a special deals sub-domain, and a shopping cart checkout sub-domain can all be defined by the manifest, such as one similar to manifest 110.

Figure 2:
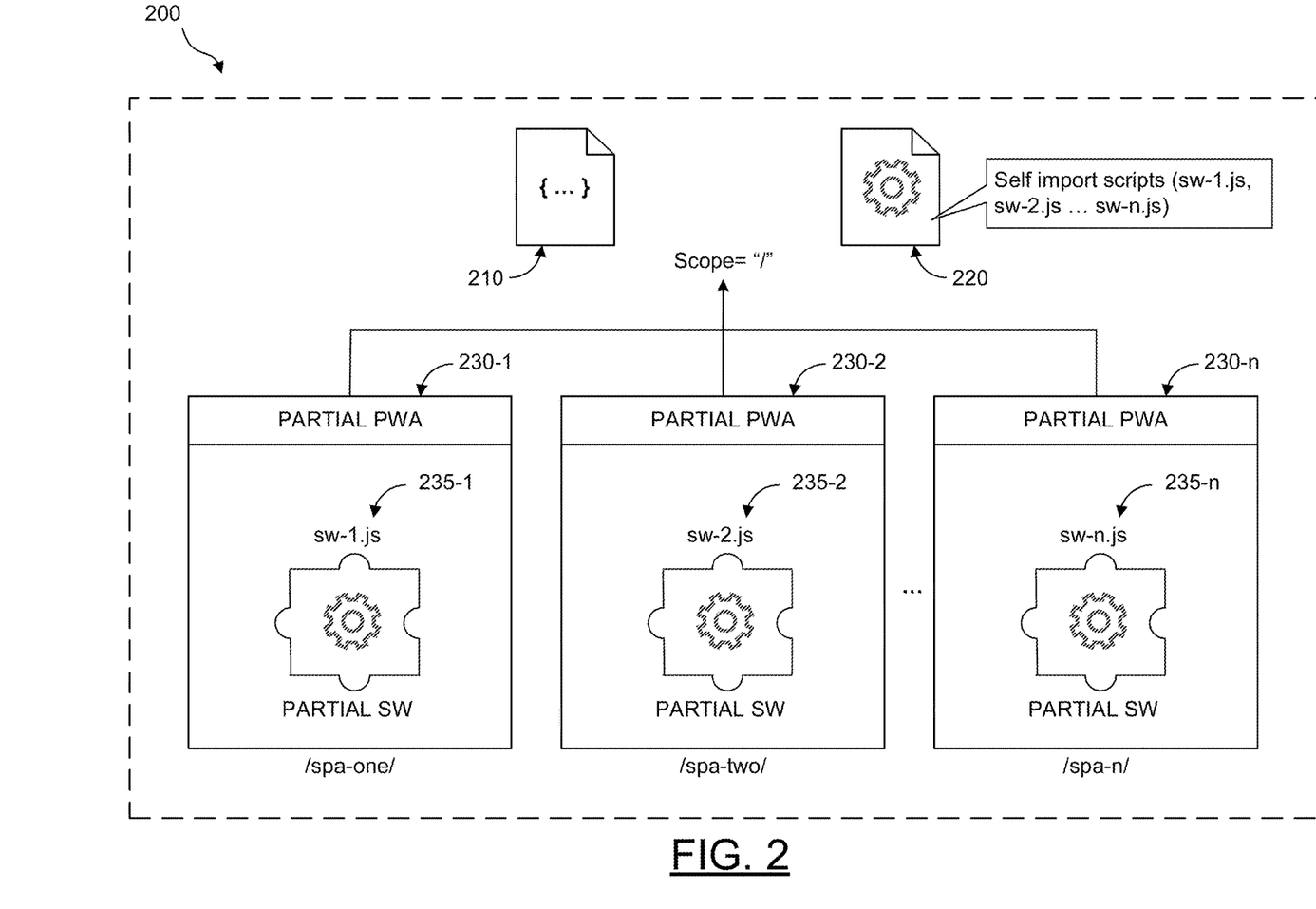
FIG. 2 is a block diagram of a progressive web application (PWA), according to embodiments of the present disclosure.

In some examples, a service worker script such as service worker script 120, located at the root, can be configured to import partial service worker scripts corresponding to the sub-domains. FIG. 2 illustrates a system 200 having a multi-SPA PWA 205 with a single root service worker 220. As shown in FIG. 2, root service worker 220 can be configured to import partial service worker scripts 235-1 through 235-n, as an example. Partial service worker scripts 235-1 through 235-n may be configured to register partial PWA functionality.

In embodiments, partial service worker scripts 235-1 through 235-n may register respective applications (e.g., web applications 230-1 through 230-n) for sub-components (or sub-domains) of the root level of the web domain. Thus, using the grocerydelivery.com example from above, partial service worker scripts 235-1 through 235-n can register web apps 230-1 through 230-n only for an applicable sub-domain, such as a landing page or a shopping cart checkout.

According to the present disclosure, a partial service worker may reside in a respective single page application (SPA) linking to a single manifest (e.g., manifest 210) at a root scope. In other words, manifest 210 supports each SPA and all of partial service worker scripts 235-1 through 235n link to manifest 210. The code underlying a SPA (e.g., the JAVASCRIPT™ file or files) enables the SPA to cache its own data (HTML, CSS, etc.). A respective SPA is only aware of files corresponding to the respective SPA.

In embodiments, PWA 205 can be updated for the root level of web domain when any partial service worker script 235 is updated. That is, in embodiments, anytime a partial service worker script is updated, the update will register as a change for root service worker 220, causing PWA 205 to update. Each web application among the plurality of web applications 230 executes PWA functionality within a respective sub-component of the root level of the web domain (e.g., landing or shopping cart checkout). In some implementations, depending on the platform used, custom service workers may be needed to prevent any issues with importing service worker scripts having pre-defined scopes.

Figure 3:
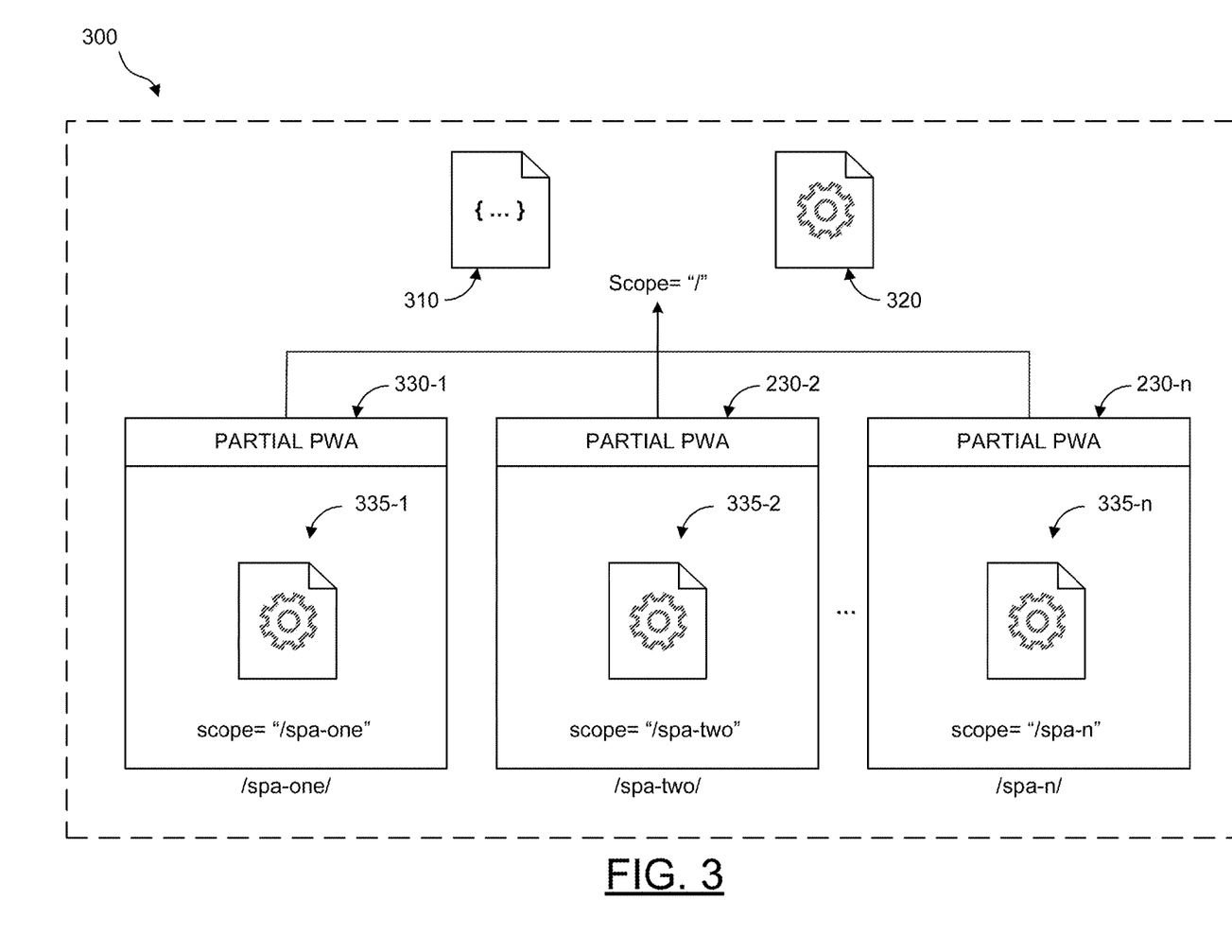
FIG. 3 is a block diagram of a progressive web application (PWA), according to embodiments of the present disclosure.

In some embodiments, service worker script 120 shown in FIG. 1 may be a global service worker script. FIG. 3 illustrates a system 300 having a multi-SPA PWA 305 with multiple service workers, which includes a global service worker 320. As shown in system 300, SPAs link to a single manifest 310 at the root scope (i.e., the scope is "/"). Global service worker 320 is registered at the root scope.

As depicted in FIG. 3, respective individual service worker scripts (e.g., service worker scripts 335-1 through 335-n) may be registered for each web application among the plurality of web applications (e.g., web applications 330-1 through 330-n). Service worker scripts 335-1 through 335-n are registered for the scope of their respective SPAs. The respective individual service worker scripts 335-1 through 335-n are in addition to global service worker 320. Each individual service worker script may be automatically generated based on the respective web application (such as from the built-in support from frameworks like Angular, React, or Vue). This can eliminate the need for service worker scripts to be imported, as with the embodiment of FIG. 2, such that custom service workers may not be needed.

While individual to each SPA, all service worker scripts 335-1 through 335-n register for all scopes upon initialization. This registration occurs regardless of which SPA loads first, to ensure that all portions of the PWA are downloaded and/or cached to the device. When any one of the components loads, a call is executed to register all service worker scripts 335-1 through 335-n. A browser loading the PWA makes a bitwise comparison on service worker scripts 335-1 through 335-n. If a change is detected in the bitwise comparison, system 300 may start to install the new service worker script or scripts (among service worker scripts 335-1 through 335-n) in the background.

The functionality to enable such updates can be accomplished through multiple approaches. As an example, a single script (file) may be embedded on a home page, that is to say at the root level. Alternatively, a similar script file may be incorporated into each of the individual components, within each sub-domain. Using this approach, a script on all components may be implemented that executes registration of all components when any one is loaded.

Figure 4:
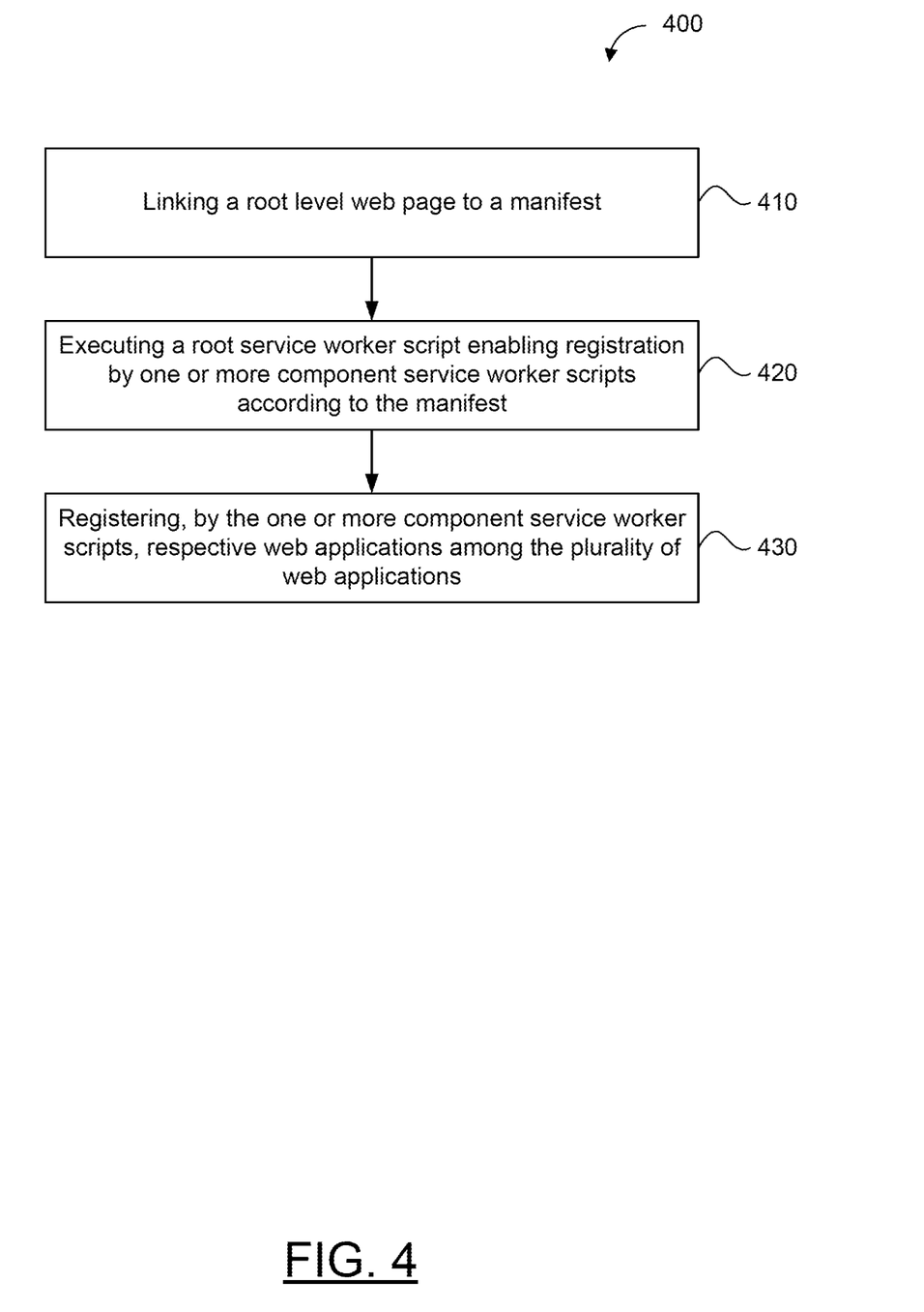
FIG. 4 is a flow chart describing a method of enabling a PWA, according to embodiments of the present disclosure.

FIG. 4 is a flowchart of a method 400 of enabling a PWA across a web domain in which a web application among a plurality of web applications executes respective portions of the PWA. Method 400 may be implemented by a system substantially similar or identical to systems 100, 200 or 300, and/or by a non-transitory computer-readable medium.

At step 410, method 400 includes linking a root level web page to a manifest. The manifest may include metadata describing a PWA architecture across the web domain. Generally, metadata is data providing information about other data, and may be one of several distinct types. For example, metadata may be descriptive, structural, administrative, statistical, for reference, among others, or a combination thereof.

Descriptive metadata may provide descriptive information about a resource (e.g., title, author, subject matter, keywords, publisher, etc.). Descriptive metadata is typically used for discovery, identification, and to search/locate an object (e.g., a web page) in a web domain. Structural metadata describes how components of an object are organized. Information corresponding to how web pages are ordered/organized, for instance, to form chapters of a book, may be included in structural metadata.

Administrative metadata may correspond to information used to manage an individual resource, a particular type of resource, or permissions. Administrative metadata may also include information corresponding to how the resource/permission was created. Statistical metadata, and repositories thereof, not only describe the source and quality of data, but also the statistical processes used in creating the data. Statistical metadata is of particular importance in both validating and improving processes of statistical data production. Reference metadata corresponds to information about the contents and quality of statistical metadata.

At step 410, method 400 includes linking a root level web page to a web application manifest (or simply "manifest"). The manifest may be a W3C (World Wide Web Consortium) specification defining a JSON-based manifest, which provides software developers a centralized location to store metadata corresponding to a web app. The manifest may contain metadata describing a PWA architecture across the web domain.

The metadata contained in the manifest may correspond to one or more of: the name of the web app, links to the web app icon or other image objects, a preferred URL to instantiate (e.g., launch or open) the web app, web app configuration data, default orientation of the web app, an option to set a display mode for the web app (e.g., full screen), among others. Metadata stored in the manifest of a web app may be added to a home screen or otherwise listed alongside native applications installed on a computing device. The computing device may be one of a personal computer, a laptop computer, a mobile handset, a tablet, or a personal digital assistant (PDA), but may be drawn from any computing device implementing web app technology.

At step 420, method 400 further includes executing a root service worker script configured to enable registration by one or more component service worker scripts according to the manifest. At step 430, method 400 further includes registering, by one or more component service worker scripts, respective web applications among the plurality of web applications. Each of the one or more component service worker scripts corresponds to a web application.

In some embodiments, executing the root service worker script may include executing a self-importing script at the root level. The self-importing script may be configured to import the one or more component service worker scripts respectively for each web application among the plurality of web applications. In other embodiments, method 300 may further include respectively registering a change to any component service worker script among the one or more component service worker scripts for each web application among the plurality of web applications.

According to the present disclosure, executing the one or more component service worker scripts may include respective scripts configured to respectively register each web application among the plurality of web applications for a sub-component of the root level web page. In some examples, method 300 may include registering each individual service worker script for all sub-components of the web domain regardless of an order in which the web applications are executed.

In some embodiments, a non-transitory computer-readable medium is embodied with a set of instructions which, when executed by one or more processors, enable a progressive web application (PWA) (e.g., PWA 105) for a web domain. The computer-readable medium may include a plurality of web applications, each web application being respectively associated with and providing functionality for a portion of the web domain. The medium may also include a manifest configured to specify the PWA architecture for the plurality of web applications across the web domain. The manifest may be further configured to execute at a root level of the web domain. The medium may also include a service worker script configured to register the PWA at the root level of the web domain.

In some embodiments, the service worker included in the non-transitory computer-readable medium configured to register the PWA at the root level of the web domain is configured to import partial service worker scripts. According to the present disclosure, the partial service worker scripts may be configured to register partial PWA functionality within a sub-component of the root level of the web domain. Moreover, the partial service worker scripts may register respective applications within a sub-component of the root level of the web domain.

In embodiments, the PWA embodied on the non-transitory computer-readable medium may be updated for the web domain if any partial service worker script is updated. In some examples, the service worker script executing on the non-transitory computer-readable medium may be a global service worker and respective individual service worker scripts may be configured to register each web application among the plurality of web applications.

Figure 5:
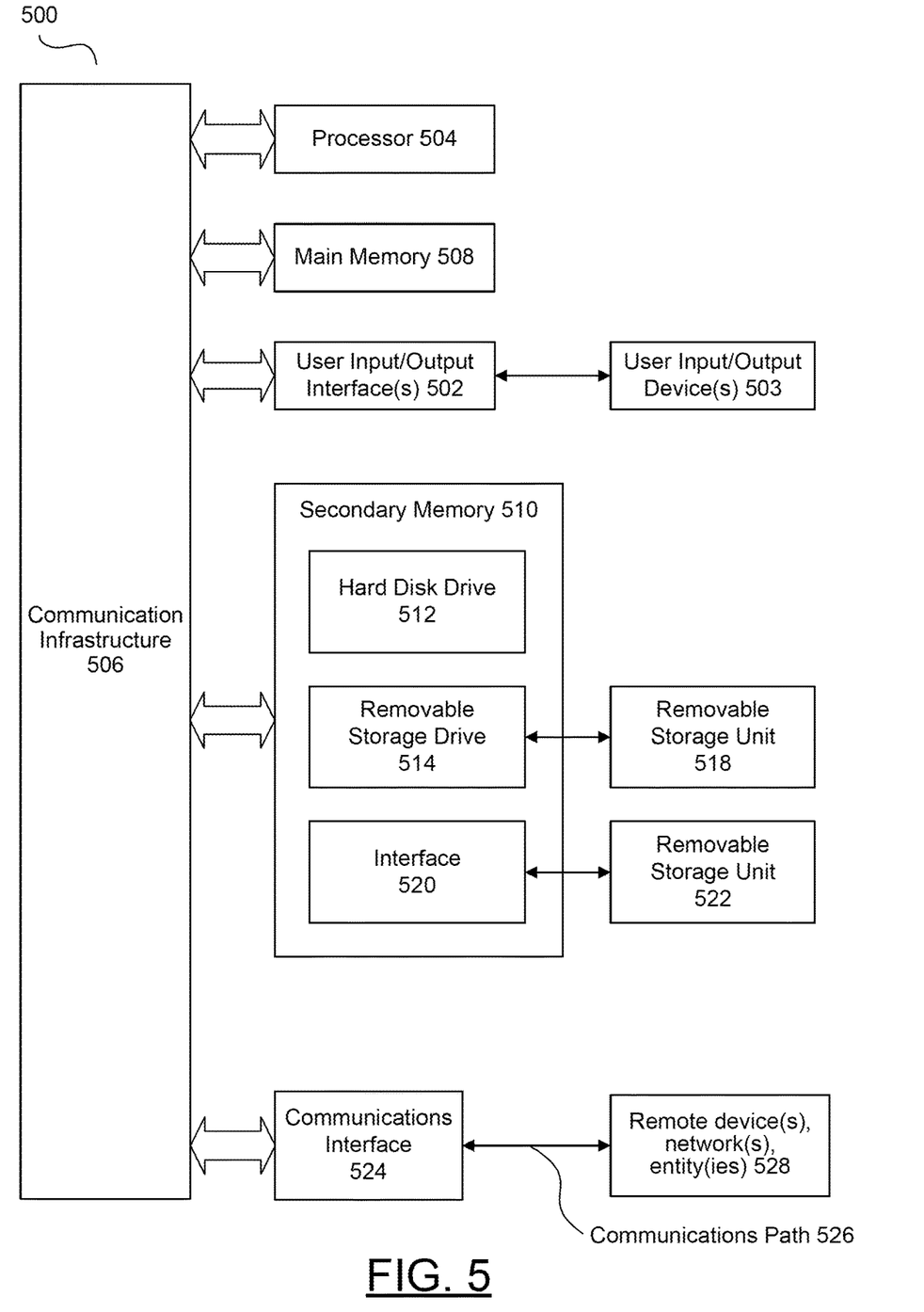
FIG. 5 is an example computer system, according to an embodiment of the present disclosure.

FIG. 5 depicts an example computer system useful for implementing various embodiments. Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (e.g., computer software) and/or data. Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments of the present application as contemplated by the inventor(s), and thus, are not intended to limit the present application and the appended claims in any way.

Embodiments of the present application have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the application that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present application should not be limited by any of the above-described exemplary embodiments, but should be defined only in accordance with the following claims and their equivalents.

What is claimed is:

1. A system enabling a progressive web application (PWA) for a web domain, the system having one or more memories configured to store instructions for the PWA and one or more processors configured to execute the PWA, the system comprising:
   a plurality of web applications, wherein each web application is respectively associated with and provides functionality for a portion of the web domain;
   a manifest configured to define a PWA architecture for the plurality of web applications across the web domain, wherein the manifest defines the PWA architecture at a root level of the web domain; and
   a service worker script configured to register the PWA at the root level of the web domain.

2. The system of claim 1, wherein the service worker script is configured to import partial service worker scripts.

3. The system of claim 2, wherein the partial service worker scripts are configured to register partial PWA functionality.

4. The system of claim 2, wherein the partial service worker scripts register respective applications for sub-components of the root level of the web domain.

5. The system of claim 2, wherein the PWA is updated for the root level of the web domain when any partial service worker script is updated.

6. The system of claim 1, wherein the service worker script is a global service worker script configured to call individual service worker scripts, and individual service worker scripts are respectively registered for each web application among the plurality of web applications.

7. The system of claim 6, wherein each web application in the plurality of web applications executes PWA functionality within a respective sub-component of the root level of the web domain.

8. The system of claim 6, wherein each individual service worker script is automatically generated based on the respective web application.

9. A method of enabling a progressive web application (PWA) across a web domain, the method comprising:
   linking a root level web page to a manifest, the manifest containing metadata describing a PWA architecture across the web domain;

executing a root service worker script configured to enable registration by one or more component service worker scripts according to the manifest; and registering, by the one or more component service worker scripts, respective web applications among a plurality of web applications, wherein the plurality of web applications are configured to execute respective portions of the PWA and each of the one or more component service worker scripts correspond to a web application in the plurality of web applications.

10. The method of claim 9, wherein executing the root service worker script comprises executing a self-importing script at the root level, the self-importing script configured to import the one or more component service worker scripts respectively for each web application among the plurality of web applications.

11. The method of claim 10, further comprising registering a change to any component service worker script among the one or more component service worker scripts as a change to the PWA and updating the PWA.

12. The method of claim 9, wherein executing the one or more component service worker scripts includes respective scripts configured to respectively register each web application among the plurality of web applications for a sub-component of the root level web page.

13. The method of claim 12 further comprising registering each individual service worker script for all sub-components of the web domain regardless of an order in which the web applications are executed.

14. A non-transitory computer-readable medium embodied with a set of instructions, which when executed by one or more processors enable a progressive web application (PWA) for a web domain, the medium comprising:

a plurality of web applications, wherein each web application is respectively associated with and provides functionality for a portion of the web domain;

a manifest configured to specify a PWA architecture for the plurality of web applications across the web domain, wherein the manifest is configured to execute at a root level of the web domain; and a service worker script configured to register the PWA at the root level of the web domain.

15. The non-transitory computer-readable medium of claim 14, wherein the service worker script is configured to import partial service worker scripts.

16. The non-transitory computer-readable medium of claim 15, wherein the partial service worker scripts are configured to register partial PWA functionality within a sub-component of the root level of the web domain.

17. The non-transitory computer-readable medium of claim 16, wherein the partial service worker scripts register respective applications within a sub-component of the root level of the web domain.

18. The non-transitory computer-readable medium of claim 15, wherein the PWA is updated for the web domain if any partial service worker script is updated.

19. The non-transitory computer-readable medium of claim 14, wherein the service worker script is a global service worker script and respective individual service worker scripts are configured to register each web application among the plurality of web applications.

20. The non-transitory computer-readable medium of claim 19, wherein each web application in the plurality of web applications is configured to execute PWA functionality within a respective sub-component of the root level of the web domain.

* * * * *